US009639961B2

(12) United States Patent
Carter et al.

(10) Patent No.: US 9,639,961 B2
(45) Date of Patent: May 2, 2017

(54) IMAGE PROCESSING (75) Inventors: Nicholas Laurence Carter, Filton (GB); Yoann Paul Georges Thueux, Gwent (GB)

(73) Assignee: BAE SYSTEMS PLC, London (GB)

( * ) Notice: Subject to any disclaimer, the term of this patent is extended or adjusted under 35 U.S.C. 154(b) by 408 days.

(21) Appl. No.: 13/126,666

(22) PCT Filed: Oct. 20, 2009

(86) PCT No.: PCT/GB2009/051404
§ 371 (c)(1),
(2), (4) Date: Apr. 28, 2011

(87) PCT Pub. No.: WO2010/049719
PCT Pub. Date: May 6, 2010

(65) Prior Publication Data
US 2011/0211762 A1    Sep. 1, 2011

(30) Foreign Application Priority Data

Oct. 28, 2008 (EP) .................................. 08275065
Oct. 28, 2008 (GB) .................................. 0819730.3

(51) Int. Cl.
*G06K 9/62*       (2006.01)
*G06T 7/00*       (2017.01)

(52) U.S. Cl.
CPC ...... *G06T 7/97* (2017.01); *G06T 2207/20021* (2013.01)

(58) Field of Classification Search
None
See application file for complete search history.

(56) References Cited

U.S. PATENT DOCUMENTS

2006/0024041 A1    2/2006 Lou et al.
2006/0125920 A1*   6/2006 Criminisi et al. ............ 348/159
(Continued)

FOREIGN PATENT DOCUMENTS

EP    1 622 083 A2    2/2006

OTHER PUBLICATIONS

Kanazawa et al., "Stabilizing Image Mosaicing by Model Selection", SMILE 2000 Revised Papers from Second European Workshop on 3D Structure from Multiple Images of Large-Scale Environments, Springer-Verlag London UK, 2001, 16 pages.*
(Continued)

*Primary Examiner* — Sumati Lefkowitz
*Assistant Examiner* — Ryan P Potts
(74) *Attorney, Agent, or Firm* — Maine Cernota & Rardin (57) ABSTRACT A method of selecting a homography model from point correspondences of an associated image pair; a method of filtering point correspondences from a pair of associated images; a method of calculating a homography transformation; and a method of image differencing; including implementing one or more sampling constraints, e.g. partition zones and an exclusion zone, that provide a more even spread of point selection over the image, and/or that provide for selected points to be spread further apart, than would be the case if the one or more sampling constraints were not implemented. Repeated selections of combinations of points may be selected in a deterministic manner, and the deterministic manner may be tailored to an escape condition.

10 Claims, 7 Drawing Sheets

(56) References Cited

U.S. PATENT DOCUMENTS

| | | |
|---|---|---|
| 2007/0143374 A1 | 6/2007 | D'Souza et al. |
| 2007/0185946 A1* | 8/2007 | Basri .................. G06K 9/34 708/200 |
| 2008/0031514 A1* | 2/2008 | Kakinami ............ G06T 7/0018 382/154 |
| 2010/0092093 A1* | 4/2010 | Akatsuka ............ G06K 9/6211 382/203 |

OTHER PUBLICATIONS

Rothganger et al., "3D Object Modeling and Recognition Using Affine-Invariant Patches and Multi-View Spatial Constraints", Proceedings of the 2003 IEEE Computer Society Conference on Computer Vision and Pattern Recognition, vol. 2, Jun. 20, 2003.*

Zucchelli, Marco, Jose Santos-Victor, and Henrik I. Christensen. "Multiple Plane Segmentation Using Optical Flow." BMVC. vol. 2. 2002. 10 pages.*

International Search Report (PCT/ISA/210) issued on Dec. 8, 2009, by European Patent Office as the International Searching Authority for International Application No. PCT/GB2009/051404.

Written Opinion (PCT/ISA/237) issued on Dec. 8, 2009, by European Patent Office as the International Searching Authority for International Application No. PCT/GB2009/051404.

Partial European Search Report issued Jun. 9, 2009 for EP 08275065.

European Search Report issued Sep. 8, 2009 for EP 08275065.

Great Britain Search Report dated Jun. 15, 2009 for GB 0819730.3.

Frank Nielsen, Randomized Adaptive Algorithms for Mosaicing Systems, IEICE Trans. Inf. & Syst., Vo. E83-D, No. 7, Jul. 2000, pp. 1386-1394.

Ariel Choukroun et al., Bucketing Techniques in Robust Regression for Computer Vision, SCIA 2003, LNCS 2749, ppl 609-616, 2003.

Eckart Michaelsen, Good Sample Consensus Estimation of 2D-Homographies for Vehicle Movement Detection from Thermal Videos, ISPRS Archives, vol. XXXIV, Part 3/W8, Munich Sep. 17-19, 2003.

Zhengyou Zhang, A robust technique for matching two uncalibrated images through the recovery of the unknown epipolar geometry, Artificial Intelligence 78, 1995, pp. 87-119.

I. Zoghlami et al., Using geometric corners to build a 2Dmosaic from a set of images, Computer Vision and Pattern Recognition, 1997, IEEE Computer Society Conference on San Juan, Puerto Rico Jun. 17-19, 1997, Los Alamitos, CA.

Martin Bujnak, Randomized and Deterministic Approaches to the Sparse Correspondence Problem, Research Reports of CMP, Czech Technical University in Prague, No. 22, 2007, pp. 1-34.

* cited by examiner

Fig.7.

IMAGE PROCESSING

FIELD OF THE INVENTION

The present invention relates to image processing, for example: identification of point correspondences between two images, selecting a model, filtering point correspondences, and image differencing.

BACKGROUND

Various image processing techniques are applied to pairs of approximately similar images. For example, two images of essentially the same scene taken at different times can be compared to detect scene changes. Another example is in the domain of stereoscopic vision, where the depth of points and objects in a given scene image may be recovered from multiple images from respective corresponding multiple cameras.

Such image processing techniques usually involve defining certain image points in the images, for example corners and edges, and resolving point correspondences between the two images. In one common approach for defining image points, Harris corners are determined using a Harris corner interest operator, as described in the reference "A Combined Corner and Edge Detector", C. Harris and M. Stephens, Proceedings of the $4^{th}$ Alvey Vision Conference, 1988, pages 147-151.

A homography represents a transformation from one plane to another. Homography matrices are commonly created from "known" correspondences between image sets. These correspondences are points which should match between the image views, and are commonly chosen based on criteria such as how salient the image region is, or how much like a corner the feature represented in the image is. These points of interest are chosen as they have been shown to be robustly repeatable across image sets. Once these points of interest have been located and corresponding points have been found (usually using a matching criteria based on the similarity of the raw pixel values, which represents how similar the areas of the image "look"), a further filtering technique is used to discard false matches. False matches are correspondences between image features which do not in fact match. These are common in real world images, and can cause considerable error to the final homography matrix if allowed to remain undiscovered in the sample set. The sample set in this case is the set of possible correspondences between the image sets.

Various techniques are known for the filtering of point correspondences. Two of the most popular techniques are Least Median Squares (LMedS) estimation and Random Sample Consensus (RANSAC). Of the two, RANSAC is the more popular technique, as it can cope with a considerable number of outliers (in this case outliers refers to false correspondences), whereas LMedS can cope with only 50% of the sample set being outliers. Under RANSAC, combinations or sets of points are chosen at random and their mapping i.e. a model is used to calculate an error for all the points compared to that mapping, and if the error is the lowest (i.e. the best score) yet determined, their mapping is stored as the best solution. After an escape condition, i.e. an end of processing criteria, is reached (e.g. a given amount of processing time or real time, or a given number of combinations), the currently stored solution is used as the best solution. RANSAC is further described in "Random Sample Consensus: A Paradigm for Model Fitting with Applications to Image Analysis and Automated Cartography", M. A. Fischler and R. C. Bolles, Communications of the Association for Computing Machinery, vol. 24, pages 381-395, 1981.

Once the outliers have been culled to the best of the ability of the filtering technique used, the remaining "good" points, called inliers, are transformed into a homography estimate. This process is often performed using a least squared approximation technique, such as Direct Linear Transform as described in "Multiple View geometry in Computer Vision", R. Hartley and A. Zisserman, Cambridge University Press, 2003, ISBN 978-0-521-54051-3.

The above approaches for the filtering of point correspondences (LmedS, RANSAC etc.) have proved successful over the years. However, they all tend to leave a certain number of outliers present, and this is exacerbated if the amount of processing allowed for the process is relatively low.

SUMMARY OF THE INVENTION

In a first aspect, the present invention provides a method of selecting a homography model from point correspondences of an associated image pair; the method comprising: implementing one or more sampling constraints that provide a more even spread of point selection over the image, and/or that provide for selected points to be spread further apart, than would be the case if the one or more sampling constraints were not implemented; and performing sample consensus constrained by the sampling constraint or constraints to select the homography model.

In a further aspect, the present invention provides a method of filtering point correspondences from a pair of associated images; the method comprising: implementing one or more sampling constraints that provide a more even spread of point selection over the image, and/or that provide for selected points to be spread further apart, than would be the case if the one or more sampling constraints were not implemented; performing sample consensus constrained by the sampling constraint or constraints to select the homography model; and filtering the point correspondences using the selected model.

In a further aspect, the present invention provides a method of calculating a homography transformation; the method comprising: implementing one or more sampling constraints that provide a more even spread of point selection over the image, and/or that provide for selected points to be spread further apart, than would be the case if the one or more sampling constraints were not implemented; performing sample consensus constrained by the sampling constraint or constraints to select the homography model; filtering the point correspondences using the selected model; and performing a least squares method on the point correspondences that remain after the filtering step.

In a further aspect, the present invention provides a method of image differencing, comprising: image differencing between two images which have been warped using point correspondences filtered by a homography model selected using a combination selection process comprising one or more sampling constraints that provide a more even spread of point selection over the image, and/or that provide for selected points to be spread further apart, than would be the case if the one or more sampling constraints were not implemented.

In each of the above aspects, performing sampling consensus may comprise repeatedly selecting combinations of points according to the one or more sampling constraints for model testing for each selected combination of points.

In each of the above aspects, respective fitness scores may be stored at the same time for different models.

In each of the above aspects, the repeated selections of combinations of points may be selected in a deterministic manner.

In each of the above aspects, the deterministic manner may be tailored to an escape condition of the method.

In each of the above aspects, it may be that all the selection combinations of points allowed by the sampling constraints are selected, each combination being selected only once.

In each of the above aspects, the sampling constraint or one of the sampling constraints may comprise the image being divided in to partition zones, wherein the selection of points is constrained based upon the partition zones.

In each of the above aspects, one point may be selected from each partition zone.

In each of the above aspects, the sampling constraint or one of the sampling constraints comprises may define an exclusion zone, wherein no points within the exclusion zone are selected.

In each of the above aspects, at least one of the zones may be defined relative to the centre of mass of the image points.

In a further aspect, the present invention provides a method of selecting a homography model from point correspondences of an associated image pair; the method comprising repeatedly selecting combinations of points for model testing in a deterministic manner such that no combination of points is selected twice.

In a further aspect, the present invention provides a storage medium storing processor-implementable instructions for controlling one or more processors to carry out the above methods.

DETAILED DESCRIPTION

Figure 1:
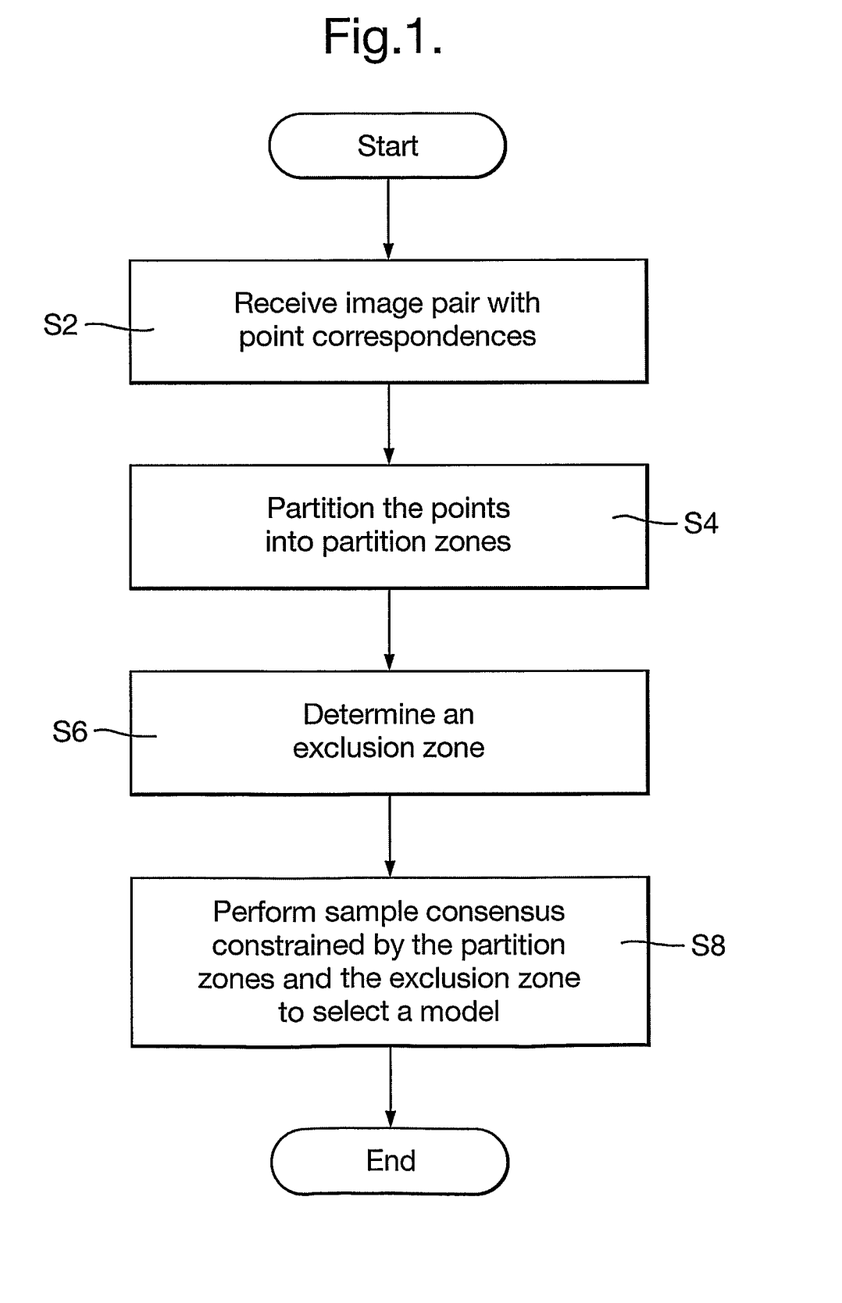
FIG. 1 is a process flowchart showing certain process steps carried out in an embodiment of a method of selecting a model.

FIG. 1 is a process flowchart showing certain process steps carried out in an embodiment of a method of selecting a model. At step s2, an image pair with point correspondences is received.

Figure 2:
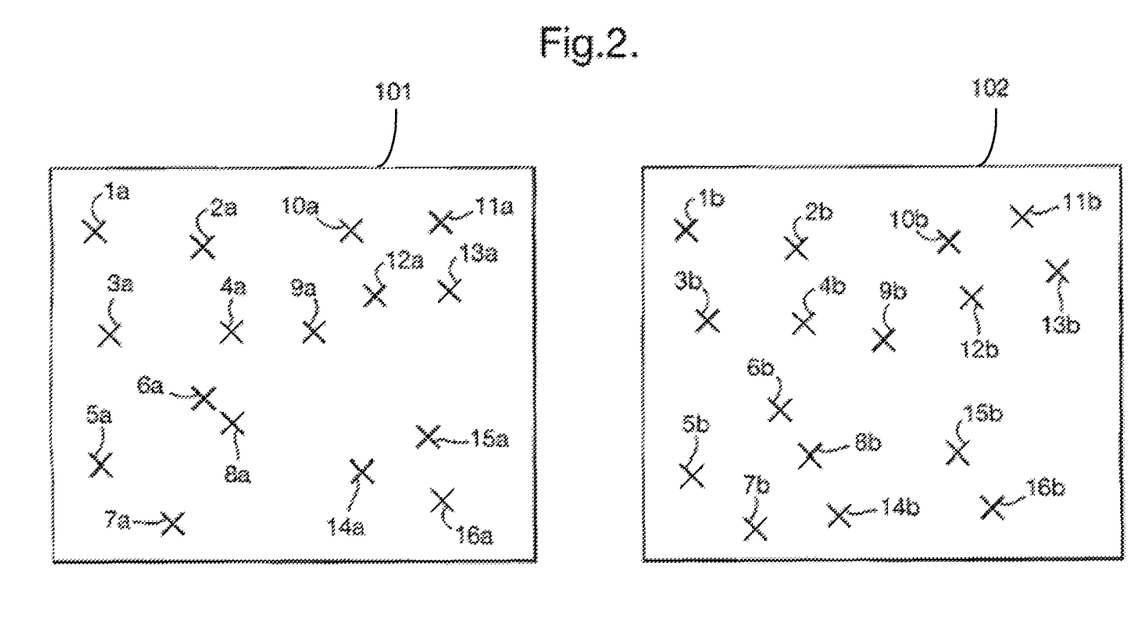
FIG. 2 is a schematic illustration of an image pair comprising a pair of associated images.

FIG. 2 is a schematic illustration of the image pair comprising a pair of associated images, namely a first image 101 and a second image 102. In this embodiment, by way of example, the two images are photographs of nominally the same scene but taken with a time delay between them and from a slightly different viewpoint. There are a large number of point correspondences between the first image 101 and the second image 102. In this embodiment, by way of example, the point correspondences are Harris corners which have been determined in conventional fashion using a Harris corner interest operator as mentioned above. In practice the number of point correspondences may be as high as, say, five thousand, however for ease of explanation the embodiment will be described in terms of only sixteen point correspondences by way of example. These sixteen point correspondences are each represented in FIG. 2 as an associated "x" in each of the first image 101 and the second image 102, and these are labelled as 1a-16a in the first image 101 and as 1b-16b in the second image 102. Thus, the point 1a in the first image 101 and the point 1b in the second image 102 together are a first point correspondence, the point 2a in the first image 101 and the point 2b in the second image 102 together are a second point correspondence, and so on through to the point 16a in the first image 101 and the point 16b in the second image 102 together being a sixteenth point correspondence.

(As an aside, it will be helpful for understanding the further details of this embodiment later below to appreciate that conventional methods of filtering of point correspondences are performed directly on the point correspondences shown in FIG. 2 without any intermediate or pre-processing. For example, if conventional RANSAC were to be implemented on the above simplified scenario of FIG. 2, a model fitting stage would repeatedly be tried for random combinations of four of the sixteen point correspondences. More particularly, sets of four point correspondences would be selected and trialled at random. That is, all combinations of four of the sixteen points are allowed in the testing, i.e. 1:2:3:4, 1:2:3:5, 1:2:3:6, 1:2:3:7, . . . , 1:2:3:16, 1:2:4:5, 1:2:4:6, 1:2:4:7, . . . , 1:2:4:16, . . . , through to 13:14:15:16. Thus each of the total of 16×15×14×13=2912 combinations is equally possibly selected at each repeat of the random point selection process.)

Figure 3:
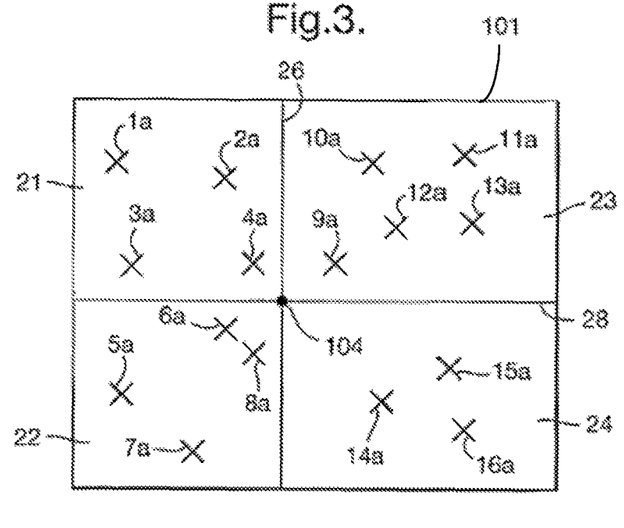
FIG. 3 is a schematic illustration of the first image of the image pair with points partitioned into four partition zones.

Referring again to FIG. 1, at step s4, the points of one of the images, e.g. the points of the first image 101, are partitioned into partition zones. FIG. 3 is a schematic illustration of the first image 101 with the points 1a-16a partitioned into four partition zones, namely a first partition zone 21, a second partition zone 22, a third partition zone 23, and a fourth partition zone 24, by two intersecting partition lines, namely a first partition line 26, and a second partition line 28. In this embodiment, the partition lines 26, 28 are perpendicular to each other and parallel to respective sides of the image (which is rectangular). In this embodiment the partition lines 26, 28 intersect at the centre of mass 104 of the points 1a-16a of the first image 101. (Note the centre of mass 104 is shown schematically in FIG. 3, i.e. in FIG. 3 the sixteen points and the centre of mass are not drawn to scale, rather FIG. 3 is merely a qualitative drawing). The position of the centre of mass 104 may be information that is received as part of the step s2 of receiving the image pair, or may for example be calculated as part of this step s4 of partitioning the points into partition zones. In this example, points 1a, 2a, 3a and 4a are in the first partition zone 21; the points 5a, 6a, 7a and 8a are in the second partition zone 22; points 9a, 10a, 11a, 12a and 13a are in the third partition zone 23; and the points 14a, 15a and 16a are in the fourth partition zone 24. (As an aside, it will be observed that there can be different numbers of points in different partition zones, which is not the case in certain other embodiments described later below).

Figure 4:
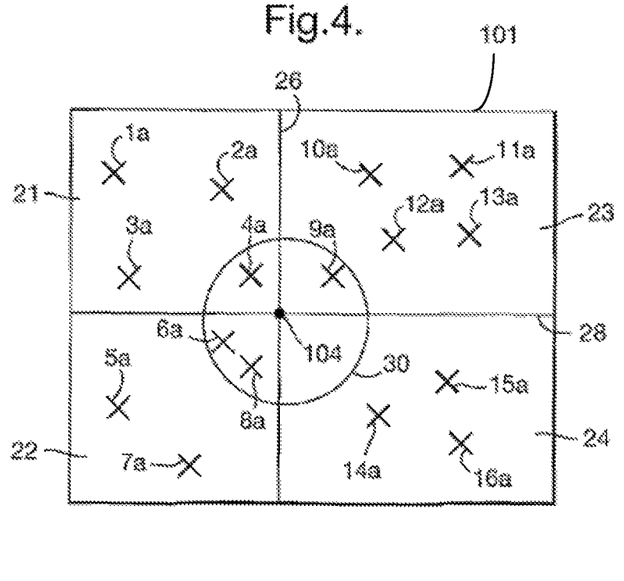
FIG. 4 is a schematic illustration of the zone partitioned first image, as shown in FIG. 3, further including an exclusion zone.

Referring again to FIG. 1, at step s6, an exclusion zone is determined for the image which has the partition zones, i.e. the first image 101. FIG. 4 is a schematic illustration of the zone partitioned first image 101, as shown in FIG. 3, further including an exclusion zone 30. In this embodiment, the exclusion zone 30 is a circle, centred at the image centre of mass 104. In this embodiment the radius of the circle defining the exclusion zone is set such that the exclusion zone 30 will enclose a given number or proportion of the points of the whole image. In this example, the point 4a in the first partition zone 21 is in the exclusion zone 30; the points 6a and 8a in the second partition zone 22 are in the exclusion zone 30; the point 9a in the third partition zone 23 is in the exclusion zone 30; and none of the points in the fourth partition zone 24 are in the exclusion zone 30. (As an aside, it will be observed that the different partition zones may have different numbers of points in the exclusion zones, which is not the case in certain other embodiments described later below).

It will be appreciated that in other embodiments steps s4 and s6 can be carried out in the reverse order, or can performed at the same time or in some form of temporal overlap.

Figure 5:
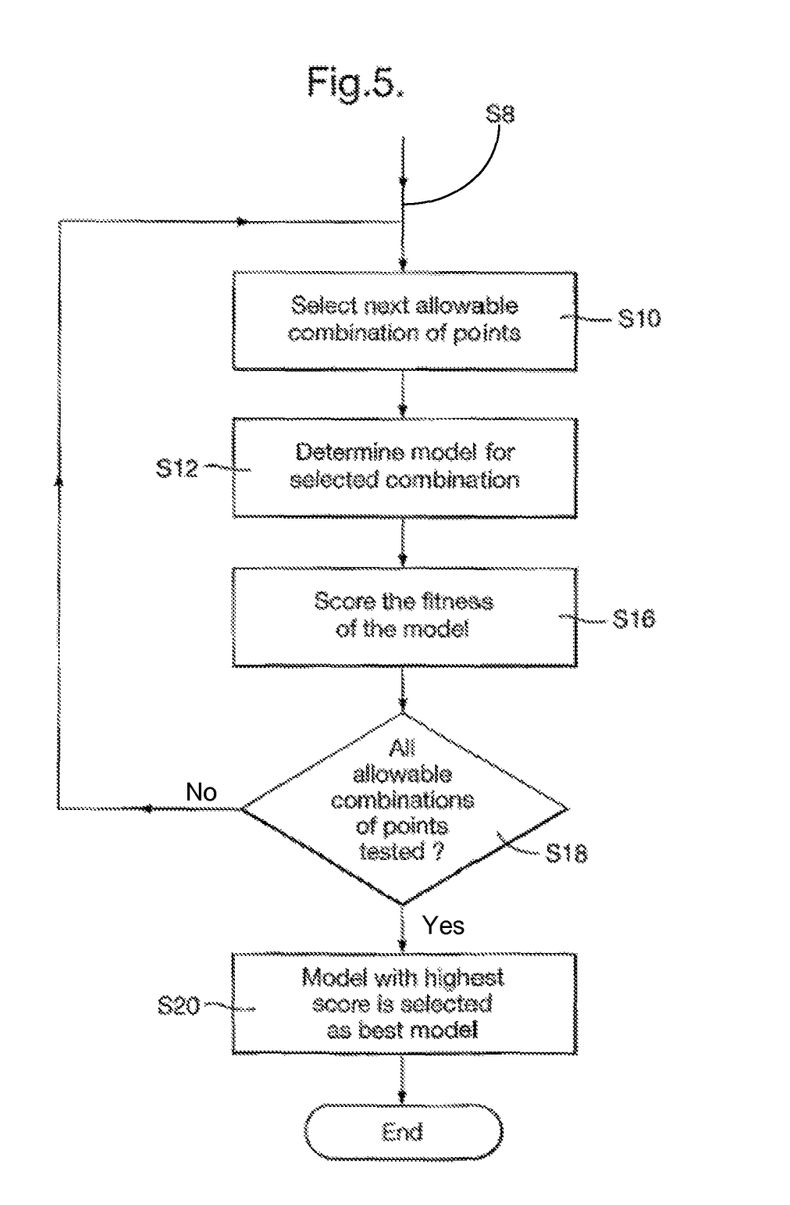
FIG. 5 is a process flowchart showing more details of one of the process steps of the method shown in FIG. 1.

Referring again to FIG. 1, at step s8, sample consensus is performed on the point correspondences, in a manner constrained by the above described partition zones 21, 22, 23, 24, and exclusion zone 30, as will now be explained in more detail with reference to the process flowchart FIG. 5, which shows process steps s10-s20 providing in combination processing step s8. In overview, step s8 is a process in which a sequence of steps (s10 to s16) are repeated until an escape condition as assessed by step s18 is determined to have been met in which case the process moves to a final step s20.

At step s10, the next allowable combination of four points is selected, which at this first pass through is the first set of four points. In this embodiment for the combination to be an allowable combination, the four points are selected according to two sampling constraints, these being a first sampling constraint based on the partition zones 21, 22, 23, 24, and a second sampling constraint based on the exclusion zone 30. The first sampling constraint is that each of the four points is selected from a respective different one of the four partition zones 21, 22, 23, 24. The second sampling constraint is that no points within the exclusion zone 30 are selected. It will be appreciated that due to the sampling constraints, a significantly smaller number of allowable combinations exist compared to the full combinations existing under e.g. RANSAC for which 2912 combinations would have been possible as calculated earlier above. In this simplified example, due to the constraints, the total number of combinations is instead only 3×2×4×3=72, which even in this simplified example is significantly less than 2912. This degree of difference will be even larger in practical implementations with far more points than the sixteen of this simplified example.

In different embodiments, different degrees of deterministic control may be exerted over the way the first, and indeed the further, sets of four points are selected whilst keeping to the above two constraints (in other embodiments such selection may not be deterministic at all, and consecutive sets may be selected entirely at random other than obeying the above constraints). Moreover, the deterministic control may be implemented in a fashion or order that is adapted to the escape condition to be used. In this embodiment, a full degree of deterministic control is exerted. Moreover, since in this embodiment the escape condition is that all allowable sets of four points are tested, the deterministic control is adapted to the escape condition to be used by being one that does not attempts to select the sets of four points in an intelligent or adaptive relative order of the sets (which is not the case in certain other embodiments described later below). More particularly, in this example the sets are chosen in any convenient order that is simple from a processing point of view (since by the end of the process each allowable set will have been tested). In this example, the points selected for the first set are, say, 1:5:10:14; i.e. with point 1 being the point selected from the first partition zone 21, point 5 being the point selected from the second partition zone 22, point 10 being the point selected from the third partition zone 23, and point 14 being the point selected from the fourth partition zone 24. It will be observed that point 9 could not be selected as the point from the third partition zone 23 because it is in the exclusion zone 30.

At step s12, a model is determined for the selected combination i.e. set of points. That is, a homography matrix is calculated from those selected points, i.e. a matrix that is based on the way those four points have actually transformed, the matrix defining the way in which all the other points would transform on that basis (or in another embodiment, the matrix defining the way in which all the other points not in the exclusion zone would transform on that basis). Thus here the model is determined from the transformations of points 1a to 1b, 5a to 5b, 10a to 10b, and 14a to 14b. (In isolation this step is the same as when performed under RANSAC.)

At step s14, the fitness of the model is scored. That is, a score is calculated for how well the model serves to accommodate the transformations of all the other points, i.e. those points not in the set, i.e. here the fitness of the model is determined from the transformations of points 2a to 2b, 3a to 3b, 4a to 4b, 6a to 6b, 7a to 7b, 8a to 8b, 9a to 9b, 11a to 11b, 12a to 12b, 13a to 13b, 15a to 15b, and 16a to 16b. Any appropriate conventional model scoring technique may be employed, using for example a Least Median Squares regime or a Least Mean Squares regime (i.e. scoring the selected combination of points by, respectively, the global Median or global Mean of the homographic residual error). In this example the technique known as Symmetric Transfer Error (STE) is used. Other possible techniques include Samson Error and Re-projection Error.

At step s16, the score for the fitness of the current model (i.e. the model for the currently selected points) is stored along with the model definition. If desired, the selected points combination can also be stored (this is possible and may be desirable due to the deterministic way in which the points have been selected at step MO).

At step s18, it is determined whether all the allowable combinations of points have been tested. If this is not the case, then the method returns to s10. As here the current combination of points is the first to be tested, all the allowable combinations of points have of course not been tested, hence the process returns to step s10.

Thus, at step s10, the next allowable combination of four points is selected, i.e. again according to the two sampling constraints described above, i.e. the first sampling constraint where each of the four points is selected from a respective different one of the four partition zones 21, 22, 23, 24; and the second sampling constraint where no points within the exclusion zone are selected. In this example, the points selected for this next set are, say, 1:5:10:15.

At step s12, a model is determined for this currently selected combination i.e. set of points. This is done in the same way as when step s12 was implemented in the first iteration as described above, except of course that here the model is determined from the transformations of points 1a to 1b, 5a to 5b, 10a to 10b, and 15a to 15b (instead of 14a to 14b).

At step s14, the fitness of the currently determined model is scored. This is done in the same way as when step s14 was implemented in the first iteration as described above, except of course that here the score is determined from the transformations of points 2a to 2b, 3a to 3b, 4a to 4b, 6a to 6b, 7a to 7b, 8a to 8b, 9a to 9b, 11a to 11b, 12a to 12b, 13a to 13b, 14a to 14b (instead of 15a to 15b), and 16a to 16b.

At step s16, the score for the fitness of the current model (i.e. the model for the currently selected points) is stored along with the model definition. If desired, the selected points combination can also be stored (this is possible and may be desirable due to the deterministic way in which the points have been selected at step s10). Later after the escape condition has been met (in this embodiment, when all the allowable points combinations have been tested), the model with the highest score will be selected as the best model (see step s20 below). However, in other embodiments, this step s16 of storing the score for the fitness of the current model and its model definition is performed only if the score is found to be the highest score so far, in which case the model stored after completion of the final iteration would be selected as the best model.

At step s18, it is determined whether all the combinations of points have been tested. If this is not the case, then the method returns to s10. As here the current combination of points is only the second to be tested, all the combinations of points have of course not been tested, hence the process returns to step s10.

The above process is repeated for all the remaining allowable combinations of points until at step s18 it is determined that all the combinations of points have indeed been tested, when the process moves to step s20.

At step s20, the model with the highest score is selected as the best model. In this embodiment, this information is retrieved from the stored values of fitness of different models (i.e. the models for each set of selected points) along with the corresponding model definitions. If at each step s16 the selected points combinations have also been stored in correspondence with the scores and models, then if desired, the corresponding points combination can also be retrieved. (In the description of step s16 earlier above it was noted that in other embodiments, the step s16 of storing the score for the fitness of the current model and its model definition is performed only if the score is found to be the highest score so far. In those embodiments, step s20 comprises selecting the model currently stored, i.e. the model stored after all the combinations of points have been tested, as the best model.)

By virtue of the above described steps s10-s20, processing step s8 of FIG. 1 is implemented.

The above described embodiments tend to provide one or more of the following advantages.

Due to the deterministic approach for selecting consecutive combinations of points, repetition of combinations selected (a disadvantage of RANSAC) can be avoided. Another consequence of the deterministic approach to selecting consecutive combinations of points is that it can be guaranteed that every allowable combination of points is tested, thereby guaranteeing that the best model is determined (this is not possible with RANSAC). Another possibility provided by the use of a deterministic approach is that details of the deterministic approach can be tailored to an escape condition (see later below for examples of this).

Due to the inclusion of the sampling constraints, fewer combinations of points are tested. Hence the search volume and/or complexity is reduced and execution time can be reduced and/or additional value obtained.

Another consequence of fewer combinations of points being tested is that a deterministic approach to selecting consecutive combinations of points, e.g. the option of avoiding repetition of combinations selected (a disadvantage of RANSAC), the option of testing every allowable combination of points, and so on, is more practicable.

Another consequence of fewer combinations of points being tested is that the above mentioned additional storing and retrieving possibilities, such as storing the points combination along with the model for the highest score, and/or storing all the scores rather than just the current highest score, are more practicable.

The above described sampling constraints (partition zones and exclusion zones) each separately contribute to an effect that the combinations of four points selected from the allowable points are in general spread more evenly over image or are spaced further apart (as opposed to grouped together spatially) than combinations would be when selected in an unconstrained manner, which will tend to provide more accurate results. (In other embodiments, either of the two sampling constraints can be used on its own to achieve this effect. In other embodiments, other sampling constraints can be used instead of or in addition to the above described partition zones and/or exclusion zone to achieve or enhance this effect.)

Furthermore, the above described exclusion zone sampling constraint produces an effect that the selected points are in general more towards the edge of the image than would be the case were the points selected in an unconstrained manner from the whole of the image, which will tend to provide more accurate results as the points towards and at the edge of the image tend to be more informative. (In other embodiments, other sampling constraints can be used instead of or in addition to the above described exclusion zone to achieve or enhance this effect.)

The above described embodiments tend to provide better results (e.g. better removal of outliers) than conventional methods.

It will further be appreciated that some or all of the above described advantages, as well as being desirable in themselves, also tend to have synergy between them. For example, by virtue of the sampling constraints being ones that constrain the allowable points and combinations to ones that provide better results than unconstrained sampled points tend to, the benefits derived from reduced sampling volume and/or complexity can be achieved with less loss in accuracy (indeed often improved accuracy) than would otherwise be the case if sampling volume and/or complexity were reduced by other random or non-advantageous ways, e.g. by randomly reducing the number of points that could be sampled in order to make a deterministic approach more practicable.

An embodiment that shows an example of a deterministic approach of selecting consecutive combinations of points being tailored to one or more escape conditions will now be described. In this embodiment, the method is the same as that shown in FIG. 1, comprising steps s2 to s8, as described for the first embodiment earlier above, except that step s8 (in which sample consensus is performed on the point correspondences, in a manner constrained by the above described partition zones 21, 22, 23, 24) is implemented differently, as will now be described with reference to FIG. 6.

Figure 6:
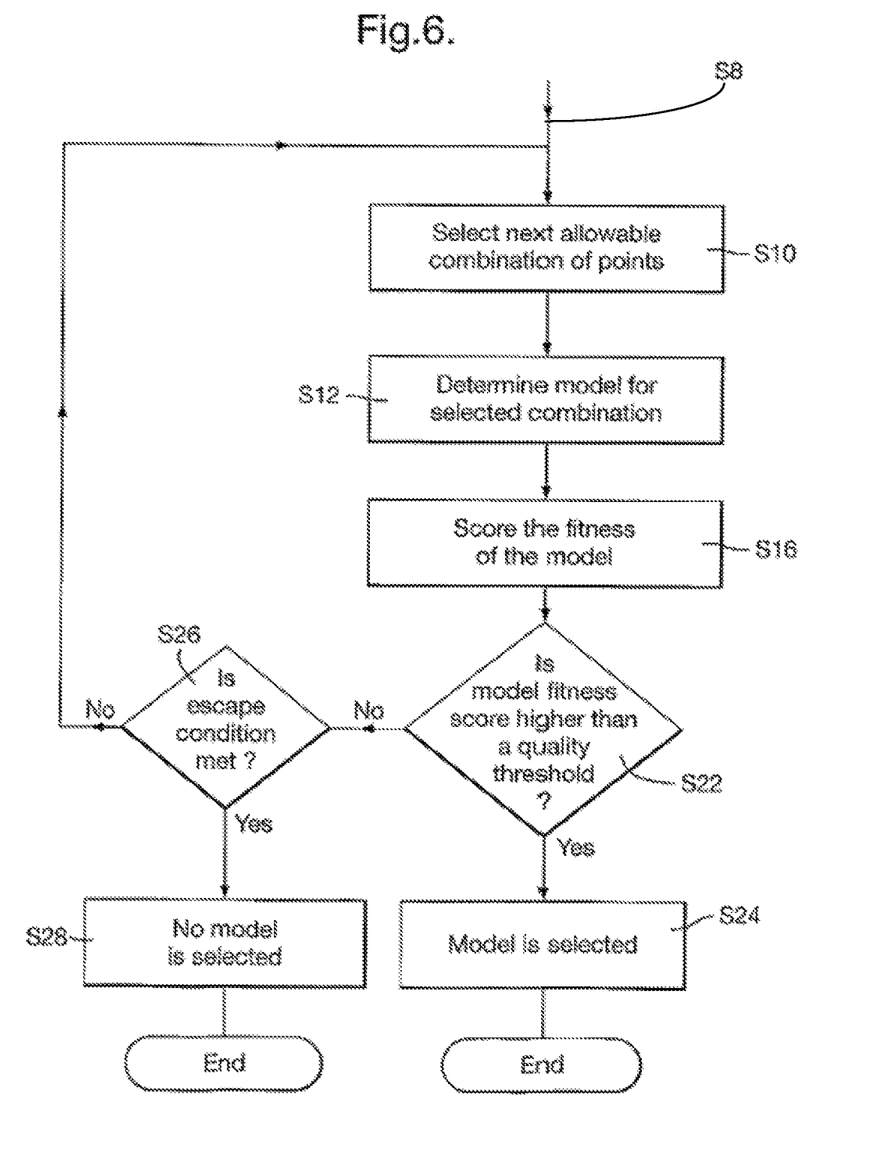
FIG. 6 is a process flowchart showing more details of one of the process steps of the method shown in FIG. 1.

FIG. 6 is a process flowchart which shows process steps s10-s28 providing in combination processing step s8. In overview, step s8 is a process in which a sequence of steps (s10 to s16) are repeated until either a model that is good enough is found as assessed at step s22 in which case the process moves to a final step s24, or until an escape condition is met as assessed at step s26 in which case the process moves to a different final step s28.

In more detail, steps s10 (selecting the next combination of points), s12 (determining the model for the selected combination), s14 (scoring the fitness of the model), and s16 (storing the fitness result) are the same as the earlier described embodiment, and are implemented in the same way, except for the following differences:

(i) in this embodiment, at step s16, the storing of the score for the fitness of the current model and its model definition is performed only if the score is found to be the highest score so far; and (ii) instead of performing step s18 of the earlier embodiment, in this embodiment after each iteration of steps s10, s12, s14 and s16 is performed, the process moves to different step s22, and depending on the outcome of step s22, to either new step s24 or new step s26 (and possibly in the event of step s26, to new step s28), as will now be described in more detail.

At step s22, it is determined whether the stored fitness score is higher than a predetermined quality threshold value of fitness score (in which case the model may be classified as a good model). If the outcome is that the stored fitness score is indeed higher than the threshold, then the process moves to step s24. At step s24, the model currently stored is selected as the model to be returned or provided, and the process is completed.

If, at step s22, the outcome is instead that the stored fitness score is not good enough, then the process moves instead to step s26. At step s26, it is determined whether the escape condition has been met. In this embodiment, the escape condition is that all the allowable combinations of points have been tested, i.e. step s26 comprises determining whether all the allowable combinations of points have been tested. If this is not the case, then the method returns to s10.

If, at step s26, the outcome is instead that all the allowable combinations of points have indeed been tested, then the process moves to step s28.

At step s28, it is determined that no model will be returned or provided, and the process is completed.

By virtue of the above described steps s10-s28, processing step s8 of FIG. 1 is implemented for this embodiment.

In other embodiments, other escape conditions may be employed at step s26 instead of the one described above. For example, the escape condition may be that a given number of models have been tested, or a given amount of processing time or other resource has been used, or a given amount of real time has passed, and so on.

Also, in other embodiments, other actions can be implemented at step s28 instead of the one described above. For example, the currently stored model can be returned or provided—in other words, if on reaching the escape condition the preferred outcome of having achieved a model that scores higher than the quality threshold has not been achieved, nevertheless as a "second best" or "fallback" possibility the current best model may be used. In such an embodiment, the quality threshold may be set at a level which is actually believed to be required for the end-application where the model is to be used. In this case the second best or fallback model will probably lead to below-par implementation of the end application. Nevertheless this may be better than not being able to carry out the end-application at all. Another possibility is that the quality threshold may be set at a level which is higher than that actually believed to be required for the end-application where the model is to be used. In this case any potential loss of performance by using the first model found to be higher than the threshold rather than e.g. testing all models is reduced by having in effect a margin of error at step s22.

As in the earlier described embodiments, in other embodiments the step s16 may comprise storing the results of each iteration rather than just the best result so far.

The above described embodiments tend to provide one or more of the following advantages.

Processing time or other resource can be saved by the early stopping of the process once a good enough result is achieved. Although such an approach could be applied with a similar advantage to a number of prior art processes (e.g. RANSAC), nevertheless, due to the other aspects of the above embodiments, in particular the sampling constraints used to determine allowable combinations of points, this advantage will tend to be achieved more quickly and more reliably than in prior art approaches.

Similarly a given escape condition is less likely to be reached without a good enough result first having been achieved, since for example the combinations of points being tested due to the sampling constraints are more likely to yield higher quality results, hence the escape condition to be used can be made less harsh since over the course of a number of uses of the method the total processing resource consumed will tend to be lower than would be the case without the tendency to yield higher quality results.

Figure 7:
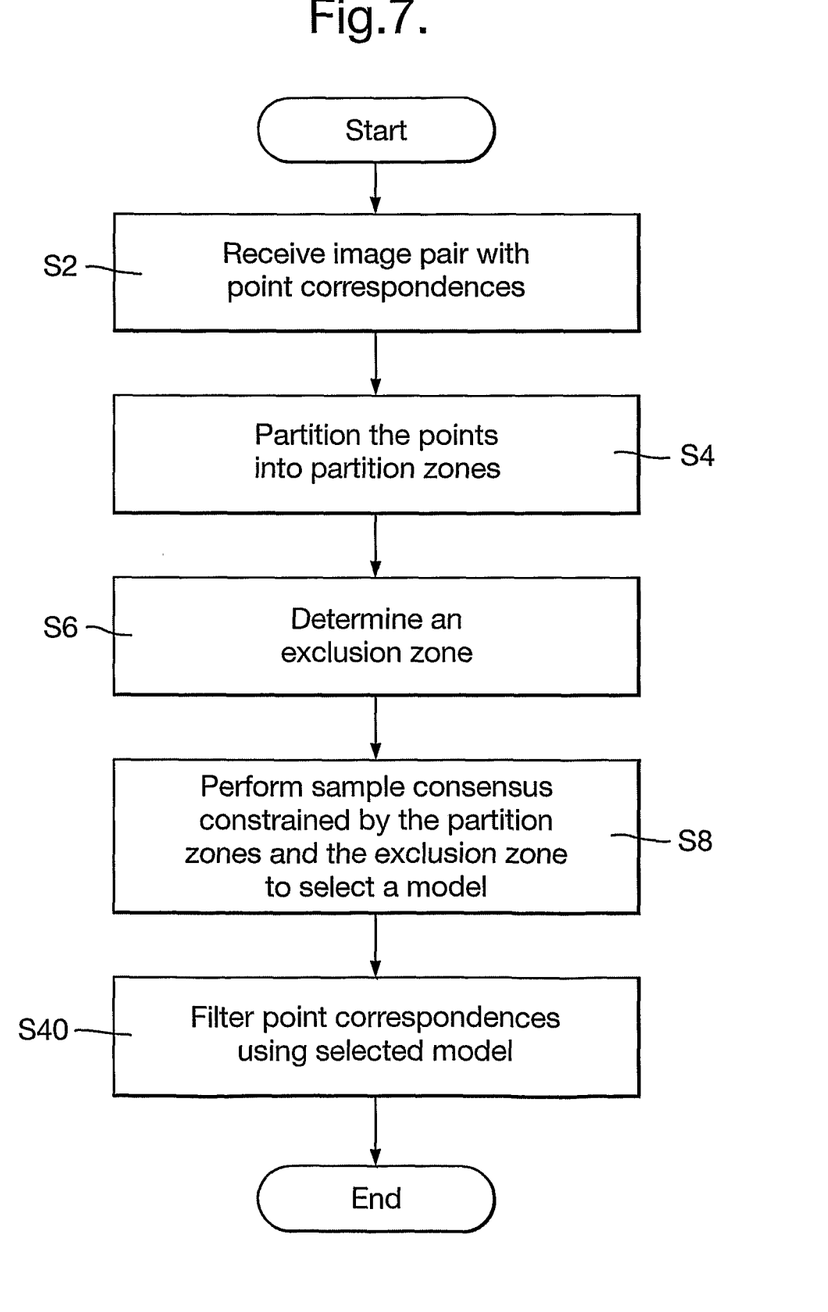
FIG. 7 is a flowchart showing certain process steps of a method of filtering received point correspondences.

In all the above embodiments, the selected model is therefore now available to be used as desired. One such use is in another intermediate type method, namely a method of filtering the received point correspondences. FIG. 7 is a flowchart showing certain process steps of such a method.

Steps s2 (receiving an image pair with point correspondences), s4 (partitioning the points into partition zones), s6 (determining an exclusion zone) and s8 (performing sample consensus constrained by the partition zones and the exclusion zone to select a model) are performed as were described earlier above with reference to FIG. 1. After step s8, where a model has been selected, the process moves to step s40.

At step s40, the point correspondences are filtered using the selected model. In this step all the actual point transformations (i.e. 1$a$ to 1$b$, 2$a$ to 2$b$, . . . , 16$a$ to 16$b$) are compared to the transformation that the point would have if the point in the first image were transformed to the second image using the selected model, and any where the error is higher than a predetermined error threshold are discarded as being outliers. In other embodiments, this comparison and potential discarding is only performed on those points that are outside the exclusion zone.

The remaining points (inliers) may then be used as desired in an intermediate application or an end-application. For example, a least squares method may be used on the remaining points to calculate a homographic transformation. As another example, one possible end-application will now be described with reference to FIG. 8.

Figure 8:
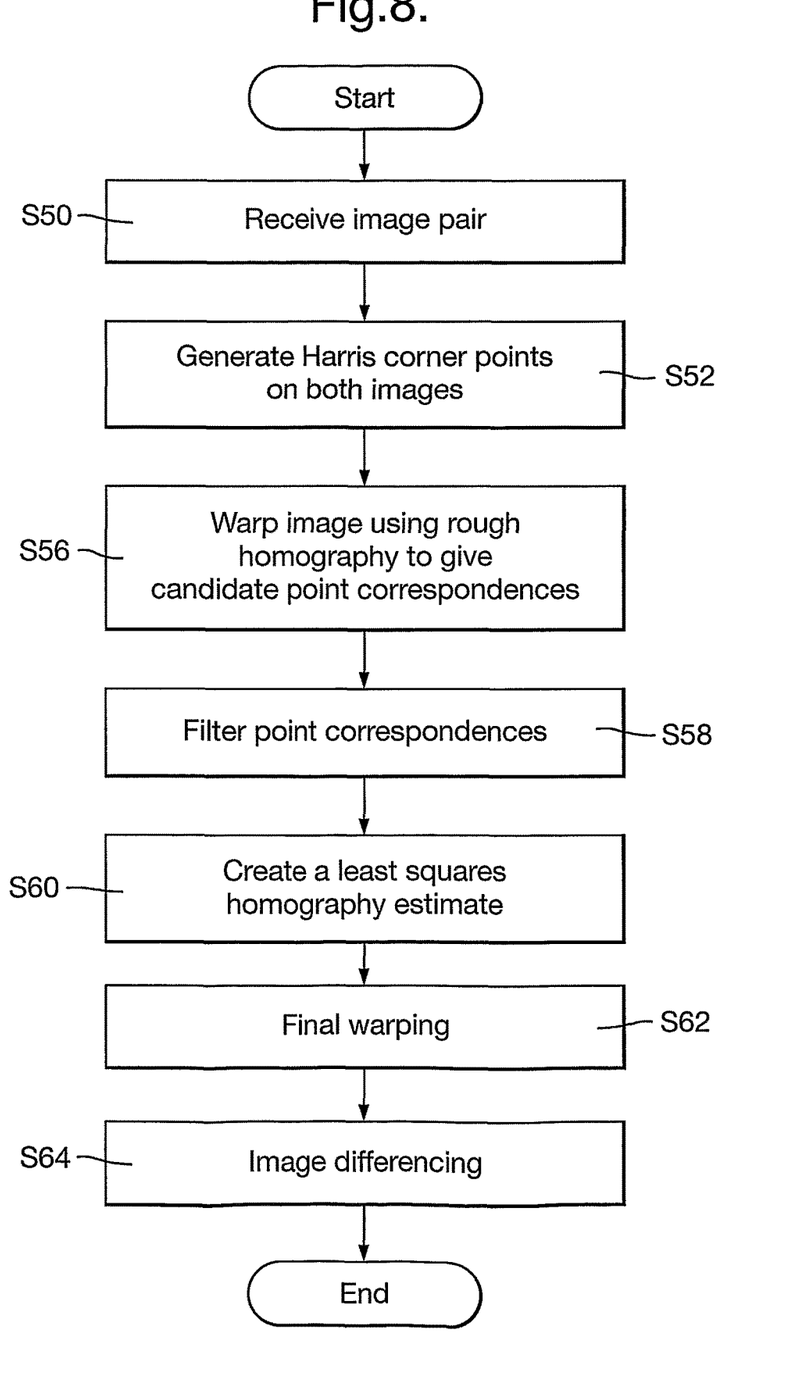
FIG. 8 is a process flowchart showing certain process steps carried out in an embodiment of a method of image differencing.

FIG. 8 is a process flowchart showing certain process steps carried out in an embodiment of a method of image differencing.

At step s50, an image pair is received. In this example the images are aerial photographs acquired from the same camera at different times, showing a degree of overlapped area.

At step s52, both images are processed using a Harris corner interest operator to locate robustly repeatable points on both images, as described for example in "A Combined Corner and Edge Detector", C. Harris and M. Stephens, Proceedings of the 4$^{th}$ Alvey Vision Conference, 1988, pages 147-151, which is incorporated herein by reference.

At step s56, patches around the Harris corner operator are tested to try to locate areas which are visually similar. These become candidate point correspondences, with some assumed level of false matches (outliers). These are provided to the next step as X and Y coordinate sets.

At step s58, the received point correspondences are filtered using the method of FIG. 7. (Strictly speaking, step s2 of FIG. 7 has already been performed by steps s50 to s58 of this method shown in FIG. 8.) The output of step s58, i.e. the output of the method of filtering the received point correspondences, is in this embodiment a best set of inliers.

At step s60, a least squares homography estimate is created for the set of inliers using a Direct Linear Transform, such as that described in "Multiple View geometry in Computer Vision", R. Hartley and A. Zisserman, Cambridge University Press, 2003, ISBN 978-0-521-54051-3, which is incorporated herein by reference.

At step s62, a final warping is performed to project one image, from its time, to the other image of the same scene, from a different time and a different viewpoint.

At step s64, image differencing is performed to determine areas where objects have moved or changed.

In the above embodiments the sampling constraints (i.e. the exclusion zone and/or the partition zones and/or other constraints providing the same effects) are accompanied with a deterministic approach to the repeated step of selecting the next allowable combination of points and/or a deterministic approach in the sense of the way in which results are stored. However, it will be appreciated that the use of one or more of the above described sampling constraints represents in itself an embodiment even without either or both of these deterministic approaches e.g. the step s10 of selecting the next allowable combination of points may comprise an entirely random selection in the sense of not being determined in whole or part by which allowable combinations have already been selected, and/or e.g. the results may be stored only in the sense of the conventional approach of only storing the best result so far. It will further be appreciated that the corollary applies, i.e. the use of one or more of the above described deterministic approaches represents in itself an embodiment even without the use of any of the above described sampling constraints, or if used with a different sample reducing method that does not provide the evening out/spacing further apart/edge of image concentrating effects of the sampling constraints described above.

In the above embodiments the constraint zones, i.e. the exclusion zone and the partition zones, are centred on the centre of mass of the correspondence points of the image, i.e. the exclusion zone is a circle centred at the centre of mass, and the perpendicular lines defining the partition zones cross at the centre of mass. However, this need not be the case, and in other embodiments the constraint zones may be centred according to other criteria, for example at the geometric centre of the image, or at some other location as required. Another possibility is that within one image one type of constraint zone, e.g. the partition zones, may be defined relative to a different point that defines another type of constraint zone, e.g. the exclusion zone—e.g. in a given image an exclusion zone may be centred at the centre of mass while the partition zones may be defined by lines that pass through the centre of the image.

In the above embodiments, where an exclusion zone is included, the exclusion zone is circular. However, this need not be the case, and in other embodiments other shapes of exclusion zone may be used. For example, the exclusion zone may be rectangular, including it may be square shaped. One particular possibility is the shape may be the same shape (but smaller) as the shape of the image area, thus providing a balance in the way points are affected by the exclusion zone.

In the above embodiments, where an exclusion zone is included, the exclusion zone is defined in part by a size of its area (e.g. the area of the circle is defined by a given radius in terms of the image size). However, this need not be the case, and in other embodiments other definitions may be employed. For example, one possibility is that the exclusion zone may be defined in terms of the number of correspondence points to be included, or alternatively a defined proportion of the total number of correspondence points. Another possibility if partition zones are present is that the exclusion zone may be defined in terms of the number of correspondence points to be included from each partition zone, or alternatively a defined proportion of the number of correspondence points to be included from each partition zone (in each case including rounding and/or calculation tolerances/accuracies where appropriate).

In the above embodiments, where partition zones are included, the partition zones are all of the same shape (rectangular) and size, and are formed by the intersection of two mutually perpendicular lines parallel to respective sides of the image. However, this need not be the case, and in other embodiments other details are possible. For example, the shapes may be other than rectangular. For example some or all of the different partition zones may be of different size to each other. For example they may be defined by shapes that are not specifically related to the shape of the image. Another possibility is that the different partition zones may each be sized so that they each contain an equal number of correspondence points (including rounding and/or calculation tolerances/accuracies where appropriate).

In the above embodiments, where partition zones are included, the number of partition zones is four, i.e. the same as the number of points to be selected in each test combination or set. However, this need not be the case. For example, in other embodiments, where a different number of points (other than four) are to be selected in each test combination or set, the number of partition zones may be defined equal to that other number. Another possibility is that the number of partition zones may be made different to the number of points to be selected in each test combination or set. In this case, the number of partition zones may be less than the number of points to be selected in each combination. For example, in relation to the above described embodiments with four selected points, the number of partition zones may be three. In this case, it may be specified that one of the three partition zones would have two points selected from it, and the other two partition zones would each have one point selected from it respectively, and in such an embodiment the partition zone specified to have two points selected therefrom could be made larger or contain more points than each of the other two. Such embodiments where the number of partition zones is less than the number of points to be selected in each combination may offer reduced processing complexity or reduced storage requirements. Another possibility is that the number of partition zones may on the contrary be more than the number of points to be selected in each combination. For example, in relation to the above described embodiments with four selected points, the number of partition zones may be eight. In this case it may be specified that the four points may be selected from any four of the eight different partition zones chosen at random. Further constraints may be defined to limit which partition zones could be selected from in relation to which other partition zones were being selected from for any given selection of four points. For example, it may be defined that points are not allowed to be selected from adjacent partition zones. These possibilities may provide an enhancement of the effect of limiting combinations of points to points that are relatively far apart from each other.

As already mentioned earlier above, in other embodiments, other sampling constraints can be used instead of or in addition to the above described partition zones and/or exclusion zone to achieve or enhance the effects provided by them.

Each of the above embodiments may be implemented by configuring or adapting any suitable apparatus, for example a computer or other processing apparatus. Alternatively, the processes described may be implemented by a processor implementing processor-implementable instructions and/or stored on a suitable storage medium, such as computer memory, hard disk, floppy disk, ROM, PROM etc. The processor may be a computer, a network of computers, or one or more dedicated processors.

The invention claimed is:

1. A method of selecting a homography model from point correspondences from a pair of associated images, the method comprising:
    partitioning at least one of the images into a plurality of partition zones;
    defining a predetermined exclusion zone within the plurality of partition zones;
    implementing a sampling constraint comprising: selecting a plurality of points in the image, each of the plurality of points being selected from a respective different one of the plurality of partitioned zones such that at least one point from each of the plurality of partitioned zones is selected; and selecting no points within the predetermined exclusion zone; and
    performing a sample consensus constrained by the sampling constraint to select the homography model,
    wherein the predetermined exclusion zone is defined before performing the sample consensus, and no points within the predetermined exclusion zone are selected to perform the sample consensus to select the homography model.

2. A method according to claim 1 comprising: filtering the point correspondences using the selected homography model.

3. A method according to claim 2 comprising: performing a least squares method on the point correspondences that remain after the filtering to calculate a homography transformation.

4. A method according to claim 1, wherein performing sampling consensus comprises:
    repeatedly selecting combinations of points according to the sampling constraint for model testing for each selected combination of points.

5. A method according to claim 4, wherein respective fitness scores are stored at a same time for different models.

6. A method according to claim 1, comprising:
    additionally implementing a further sampling constraint, the further sampling constraint comprising the image being divided into partition zones, wherein the selection of points is constrained based upon the partition zones.

7. A method according to claim 6, wherein one point is selected from each partition zone.

8. A method according to claim 1, wherein the predetermined exclusion zone is defined relative to a centre of mass of plural image points.

9. A method of image differencing, comprising:
    image differencing between two images which have been warped using point correspondences filtered by a homography model selected using a combination selection process comprising a sampling constraint comprising defining a predetermined exclusion zone;
    partitioning at least one of the images into a plurality of partition zones; and
    defining the predetermined exclusion zone within the plurality of partition zones, wherein the image differencing between the two images comprises: selecting a plurality of points in the image, each of the plurality of points being selected from a respective different one of the plurality of partitioned zones such that at least one point from each of the plurality of partitioned zones is selected; and selecting no points within the predetermined exclusion zone,
    wherein the predetermined exclusion zone is defined before performing the combination selection process, and no points within the predetermined exclusion zone are selected to perform the combination selection process to select the homography model.

10. A non-transitory storage medium storing processor-implementable instructions for controlling one or more processors to carry out a method of selecting a homography model from point correspondences from a pair of associated images, the method comprising:
    partitioning at least one of the images into a plurality of partition zones;
    defining a predetermined exclusion zone within the plurality of partition zones,
    implementing a sampling constraint comprising selecting a plurality of points in the image, each of the plurality of points being selected from a respective different one of the plurality of partitioned zones such that at least one point from each of the plurality of partitioned zones is selected; and selecting no points within the predetermined exclusion zone; and
    performing a sample consensus constrained by the sampling constraint or constraints to select the homography model wherein the predetermined exclusion zone is defined before performing the sample consensus, and no points within the predetermined exclusion zone are selected to perform the sample consensus to select the homography model.

* * * * *